US008781522B2

(12) United States Patent
Tran et al.

(10) Patent No.: US 8,781,522 B2
(45) Date of Patent: Jul. 15, 2014

(54) ADAPTABLE ANTENNA SYSTEM

(75) Inventors: Allen Minh-Triet Tran, San Diego, CA (US); Ernest T. Ozaki, Poway, CA (US); Jatupum Jenwatanavet, San Diego, CA (US); Gregory Alan Breit, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1501 days.

(21) Appl. No.: 11/555,783

(22) Filed: Nov. 2, 2006

(65) Prior Publication Data

US 2008/0106476 A1 May 8, 2008

(51) Int. Cl.
*H04M 1/00* (2006.01)

(52) U.S. Cl.
USPC ........... 455/552.1; 455/13.3; 455/19; 455/82; 455/83; 455/121; 455/193.1; 343/777; 343/876; 343/745

(58) Field of Classification Search
USPC ........... 343/702, 777, 876, 745; 455/13.3, 19, 455/82, 83, 121, 193.1
See application file for complete search history.

(56) References Cited

U.S. PATENT DOCUMENTS

| | | | | |
|---|---|---|---|---|
| 5,420,599 | A | 5/1995 | Erkocevic | |
| 5,794,145 | A * | 8/1998 | Milam | 455/426.1 |
| 5,838,282 | A * | 11/1998 | Lalezari et al. | 343/727 |
| 6,212,242 | B1 * | 4/2001 | Smith et al. | 375/299 |
| 6,271,796 | B1 | 8/2001 | Itoh et al. | |
| 6,373,682 | B1 * | 4/2002 | Goodwin-Johansson | 361/278 |
| 6,476,769 | B1 * | 11/2002 | Lehtola | 343/702 |
| 6,480,158 | B2 * | 11/2002 | Apostolos | 343/700 MS |
| 6,512,482 | B1 | 1/2003 | Nelson et al. | |
| 6,650,295 | B2 | 11/2003 | Ollikainen et al. | |
| 6,765,536 | B2 | 7/2004 | Phillips et al. | |
| 7,129,894 | B1 | 10/2006 | Winter | |
| 7,498,987 | B2 | 3/2009 | Svigelj et al. | |
| 7,606,553 | B2 * | 10/2009 | Konaka | 455/403 |
| 7,663,555 | B2 | 2/2010 | Caimi et al. | |
| 2002/0002037 | A1 | 1/2002 | Ito et al. | |
| 2002/0063475 | A1 * | 5/2002 | Freeston et al. | 307/112 |
| 2002/0183013 | A1 * | 12/2002 | Auckland et al. | 455/73 |
| 2003/0057279 | A1 * | 3/2003 | Uozumi et al. | 235/451 |

(Continued)

FOREIGN PATENT DOCUMENTS

| | | | |
|---|---|---|---|
| CN | 1623250 | A | 6/2005 |
| CN | 102067624 | A | 5/2011 |

(Continued)

OTHER PUBLICATIONS

International Search Report and Written Opinion—PCT/US2007/082480, International Search Authority—European Patent Office—Jul. 17, 2008.

*Primary Examiner* — Khalid Shaheed
(74) *Attorney, Agent, or Firm* — Ramin Mobarhan

(57) ABSTRACT

The invention utilizes small, narrow-band and frequency adaptable antennas to provide coverage to a wide range of wireless modes and frequency bands on a host wireless device. The antennas have narrow pass-band characteristics, require minimal space on the host device, and allow for smaller form factor. The frequency tunability further allows for a fewer number of antennas to be used. The operation of the antennas may also be adaptably relocated from unused modes to in-use modes to maximize performance. These features of the antennas result in cost and size reductions. In another aspect, the antennas may be broadband antennas.

37 Claims, 7 Drawing Sheets

(56) References Cited

U.S. PATENT DOCUMENTS

| | | | | |
|---|---|---|---|---|
| 2003/0072382 | A1* | 4/2003 | Raleigh et al. | 375/267 |
| 2003/0114188 | A1* | 6/2003 | Rousu | 455/553 |
| 2003/0122721 | A1 | 7/2003 | Sievenpiper | |
| 2004/0146018 | A1* | 7/2004 | Walton et al. | 370/329 |
| 2004/0227678 | A1 | 11/2004 | Sievenpiper | |
| 2005/0009472 | A1* | 1/2005 | Shamsaifar | 455/77 |
| 2005/0184731 | A1* | 8/2005 | Warren et al. | 324/348 |
| 2006/0092079 | A1* | 5/2006 | de Rochemont | 343/700 MS |
| 2006/0256030 | A1 | 11/2006 | Umehara | |
| 2007/0013927 | A1 | 1/2007 | Miyahara et al. | |
| 2007/0069956 | A1 | 3/2007 | Ozkar | |
| 2007/0069958 | A1 | 3/2007 | Ozkar | |
| 2007/0123181 | A1* | 5/2007 | Bit-Babik et al. | 455/101 |
| 2007/0139276 | A1 | 6/2007 | Svigelj et al. | |
| 2007/0142001 | A1* | 6/2007 | Sanders | 455/101 |
| 2008/0102762 | A1* | 5/2008 | Liu et al. | 455/78 |
| 2008/0129639 | A1 | 6/2008 | Mitsugi | |
| 2008/0287084 | A1 | 11/2008 | Krebs et al. | |
| 2009/0189824 | A1 | 7/2009 | Nishikido et al. | |
| 2010/0231461 | A1 | 9/2010 | Tran | |

FOREIGN PATENT DOCUMENTS

| | | | |
|---|---|---|---|
| EP | 1168658 | A1 | 1/2002 |
| EP | 1641072 | A1 | 3/2006 |
| JP | 1995131229 | | 5/1995 |
| JP | H11136020 | A | 5/1999 |
| JP | 2001102980 | A | 4/2001 |
| JP | 2001284943 | A | 10/2001 |
| JP | 2002009679 | A | 1/2002 |
| JP | 2003124730 | A | 4/2003 |
| JP | 2004274223 | A | 9/2004 |
| JP | 2004336154 | A | 11/2004 |
| JP | 2005514844 | | 5/2005 |
| JP | 2006505973 | T | 2/2006 |
| JP | 2006094287 | A | 4/2006 |
| JP | 2006203648 | A | 8/2006 |
| JP | 2006319437 | A | 11/2006 |
| JP | 2007104325 | A | 4/2007 |
| JP | 2007534196 | A | 11/2007 |
| JP | 2008118535 | A | 5/2008 |
| JP | 2008294635 | A | 12/2008 |
| KR | 20050119209 | A | 12/2005 |
| KR | 20060029688 | A | 4/2006 |
| KR | 20080081174 | A | 9/2008 |
| WO | WO9950933 | | 10/1999 |
| WO | WO0152445 | | 7/2001 |
| WO | WO03058758 | A1 | 7/2003 |
| WO | WO03096474 | A1 | 11/2003 |
| WO | WO2004042868 | A1 | 5/2004 |
| WO | 2005022690 | A1 | 3/2005 |
| WO | 2005109569 | A1 | 11/2005 |
| WO | WO2006077683 | A1 | 7/2006 |
| WO | WO2009027579 | | 3/2009 |
| WO | WO2009155966 | | 12/2009 |

* cited by examiner

ADAPTABLE ANTENNA SYSTEM

REFERENCE TO CO-PENDING APPLICATIONS FOR PATENT

The present application for patent is related the co-pending U.S. patent application Ser. No. 11/213,464, entitled "TUNABLE DUAL-ANTENNA SYSTEM FOR MULTIPLE FREQUENCY BAND OPERATION," filed Aug. 26, 2005, assigned to the assignee hereof, and expressly incorporated by reference herein.

BACKGROUND

1. Field

The present application generally relates to communications and, more specifically, to an adaptable antenna system.

2. Background

Wireless communication devices have different antenna requirements used in next generation wireless network systems. Detailed antenna configurations necessary to meet these requirements are impacted by many factors such as specific carrier requirements (e.g., operational modes, band classes, desired functionality) and device type (e.g., handsets, desktop modems, laptops, PCMCIA cards, PDAs, etc.). In addition, with the growing number of wireless standards (WWAN, WLAN, BlueTooth, UWB, FLO, DVB-H, etc.) and frequency bands (from approximately 410 MHz up to approximately 11 GHz), the conventional approach has been to add new antennas for the new standards and/or frequency bands on the host wireless devices. This adds costs (for the antenna elements, associated cables and connectors), requires additional space on the wireless device and also degrades isolation between the different RF transceivers. Accordingly, there is a need in the art for a new antenna configuration such that the number of antennas may be kept to a minimum (i.e., no more than the existing number of antennas in current devices) while the antennas may still be able to support the up and coming wireless standards and new frequency spectrum.

SUMMARY

The invention utilizes small, narrow-band and frequency adaptable antennas to provide coverage to a wide range of wireless modes and frequency bands on a host wireless device. These antennas have narrow pass-band characteristics, require minimal space on the host device, and allow for smaller form factor. The invention also allows for fewer number of antennas to be used because of the frequency tunability feature of the small antennas together with the use of the transfer switch matrix. The operation of the antennas may also be adaptably relocated from unused modes to in-use modes to maximize performance. The features of the invention result in cost and size reductions of the antennas.

The host wireless device may be a portable phone, PDA, laptop, body-worn sensor, entertainment component, wireless router, tracking device and others. By making the antenna narrow-band in its frequency response, its physical size may be made much smaller than a conventional resonant antenna currently being used in existing wireless devices. To operate at a desired wireless channel or in a certain frequency sub-band or band at any given time, this small antenna is designed to have electronically selectable resonant frequency feature. This frequency adaptability allows for one small antenna to cover all the required wireless standards and frequency bands. Under some circumstances, more than one wireless modes may be required to operate concurrently. In this case, a second small tunable antenna similar to the first one may be employed on the same host wireless device. These two antennas may operate in different bands simultaneously. These antennas may also operate in the same frequency band simultaneously. Furthermore, in the same frequency band, one of these antennas may be used for transmitting and the other may be used for receiving simultaneously. Since these antennas have very narrow operating frequency response or pass band, the isolation between these antennas is much higher than that between the existing antennas currently being used on existing wireless devices. This is another feature of the invention, i.e., high isolation between antennas for concurrent operation without the need of adding more front-end filters.

It is appreciated that the number of these small, narrow-band, frequency tunable antennas may also be increased to more than two to support more than two concurrent operating modes. The operating frequencies and modes of these antennas may be adaptable to where resource and performance are needed most in the host device based on a preset performance criteria or user preference and selectivity. This allows for fewer number of antennas that can cover a given number of wireless modes and frequency bands. Performance is optimized and adaptable to where it is needed and/or required. For example, one or more of the multiple antennas may be used to suppress RF interference within the device or mitigate body or external effects. Antenna resource in this invention is adaptable and may be redirected to where it is needed most or may be divided based on a certain order of priorities.

DETAILED DESCRIPTION

Figure 1:
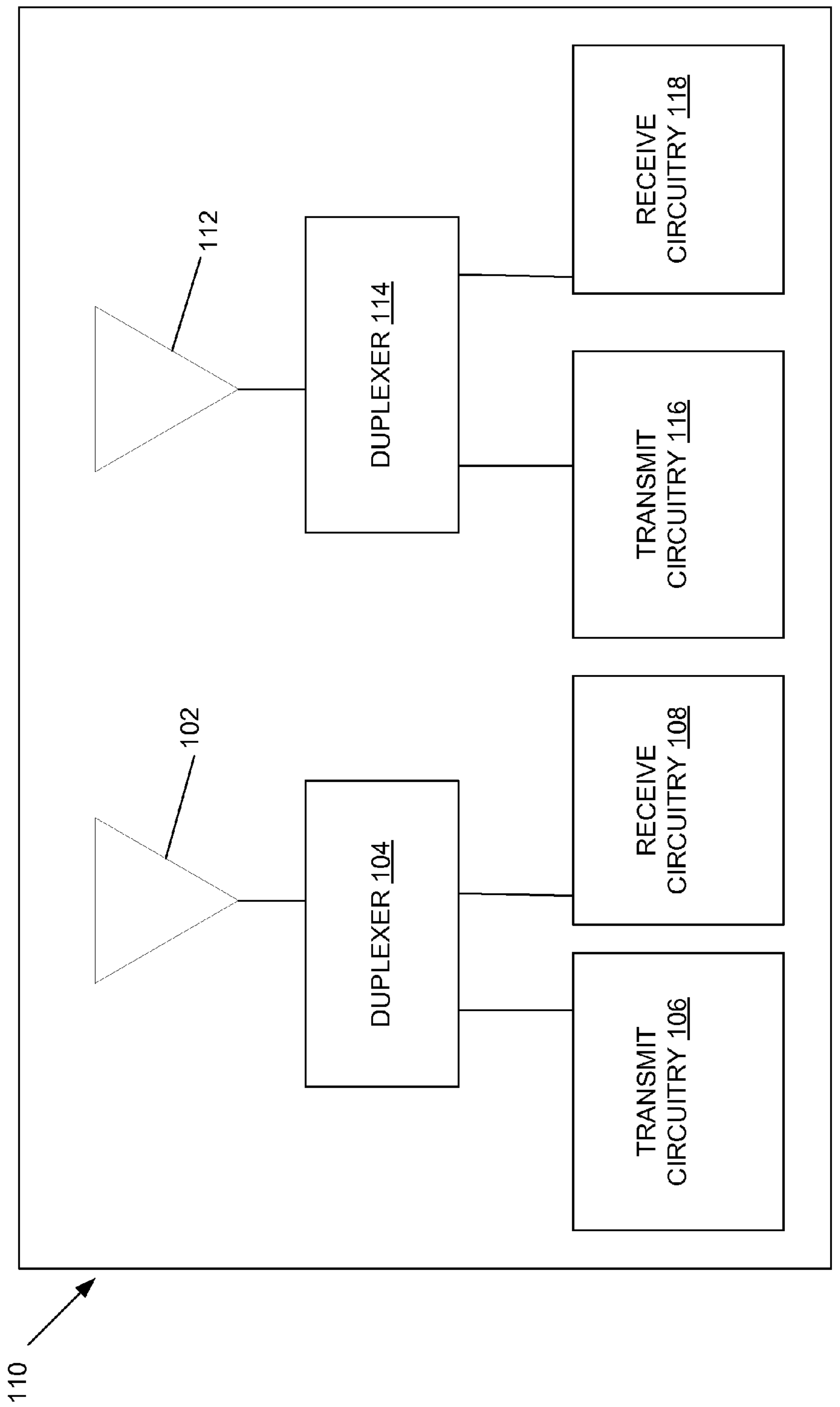
FIG. 1 illustrates a system with multiple transmit/receive antennas.

Some wireless communication devices, such as "world phones," are intended to operate with multiple frequency bands ("multi-band") and multiple communication standards ("multi-mode"), which may need a multi-band antenna and/or multiple antennas to function properly. A law of physics dictates a multi-band antenna to be electrically bigger than a single-band antenna to function over the required frequency bands. As illustrated in FIG. 1, a "multi-band" device may use one transmit/receive antenna for each frequency band and thus have multiple transmit/receive antennas. Alternatively, a "multi-band" device may use one multi-band antenna, but is required to add a multiplexer or a single-pole-multiple-throws switch to route the antenna signal for each frequency band to the appropriate transmitter and receiver of each band.

Similarly, a "multi-mode" device may use one transmit/receive antenna for each communication standard and thus have multiple transmit/receive antennas. Alternatively, a "multi-mode" device may use one multi-band antenna with additional multiplexers or single-pole-multiple-throws switches to operate. Some wireless standards, such as EVDO (Evolution Data Optimized) and MIMO (Multiple Input Multiple Output), may use diversity schemes that need additional antennas to enhance data throughput performance and voice quality. The desire for more multi-band antennas on a wireless communication device has grown and has become an issue due to an increase in size and cost of wireless devices.

Referring back to FIG. 1, there is shown a system 110 with multiple transmit/receive antennas 102, 112, duplexers 104, 114, transmit circuitries 106, 116 and receive circuitries 108, 118. As an example, antenna 102, duplexer 104, transmit circuitry 106 and receive circuitry 108 may be configured to transmit and receive CDMA signals, while antenna 112, duplexer 114, transmit circuitry 116 and receive circuitry 118 may be configured to transmit and receive GSM or WCDMA signals.

Figure 2:
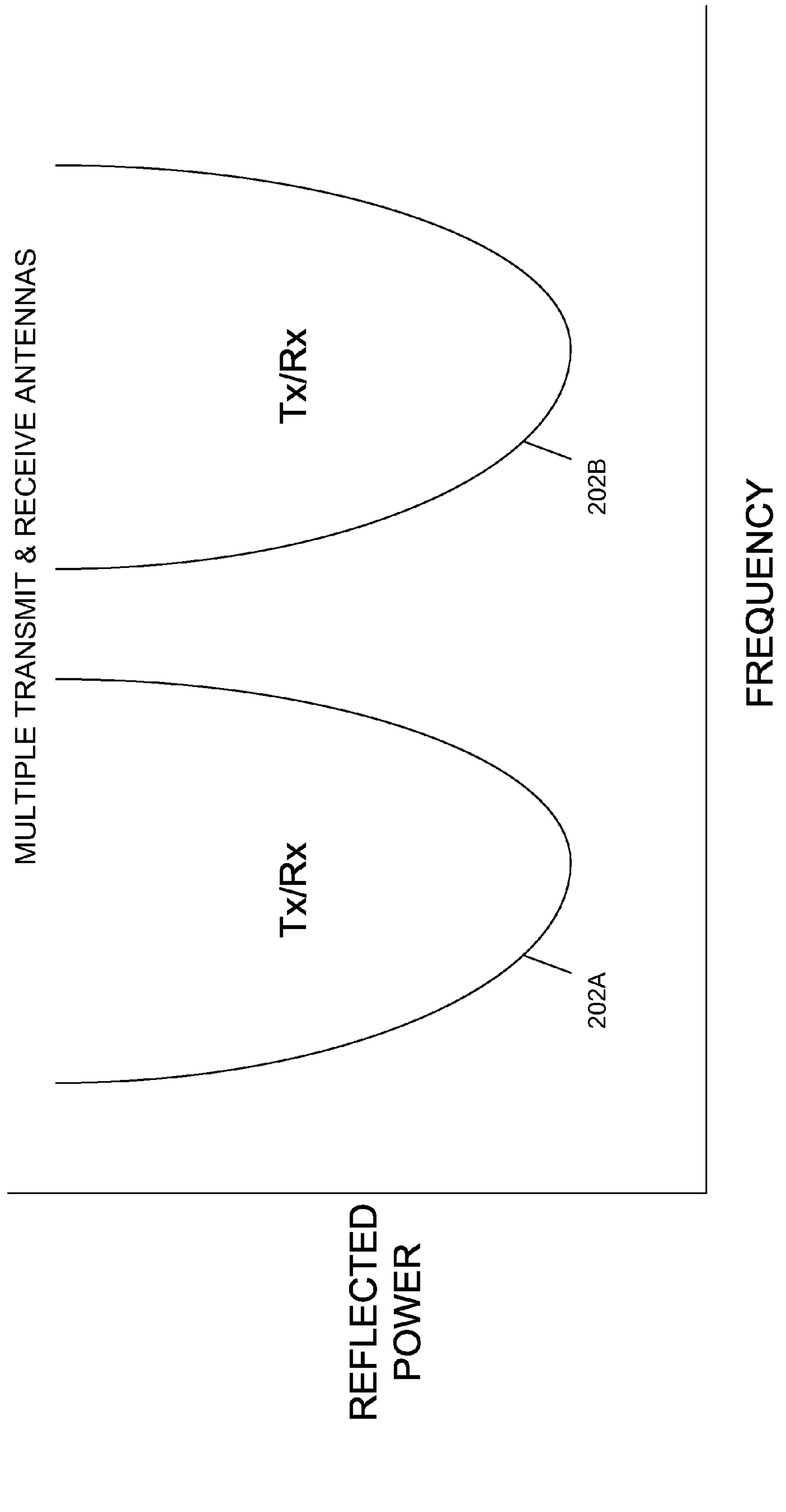
FIG. 2 illustrates antenna frequency response in terms of reflected power for transmit and receive frequency bands for the system of FIG. 1.

FIG. 2 illustrates antenna frequency response in terms of reflected power for transmit and receive frequency bands 202A, 202B for the system 110 of FIG. 1. As an example, an ideal transmit frequency band may be 824-849 Megahertz (MHz), and an ideal receive frequency band may be 869-894 MHz in one configuration.

Figure 3:
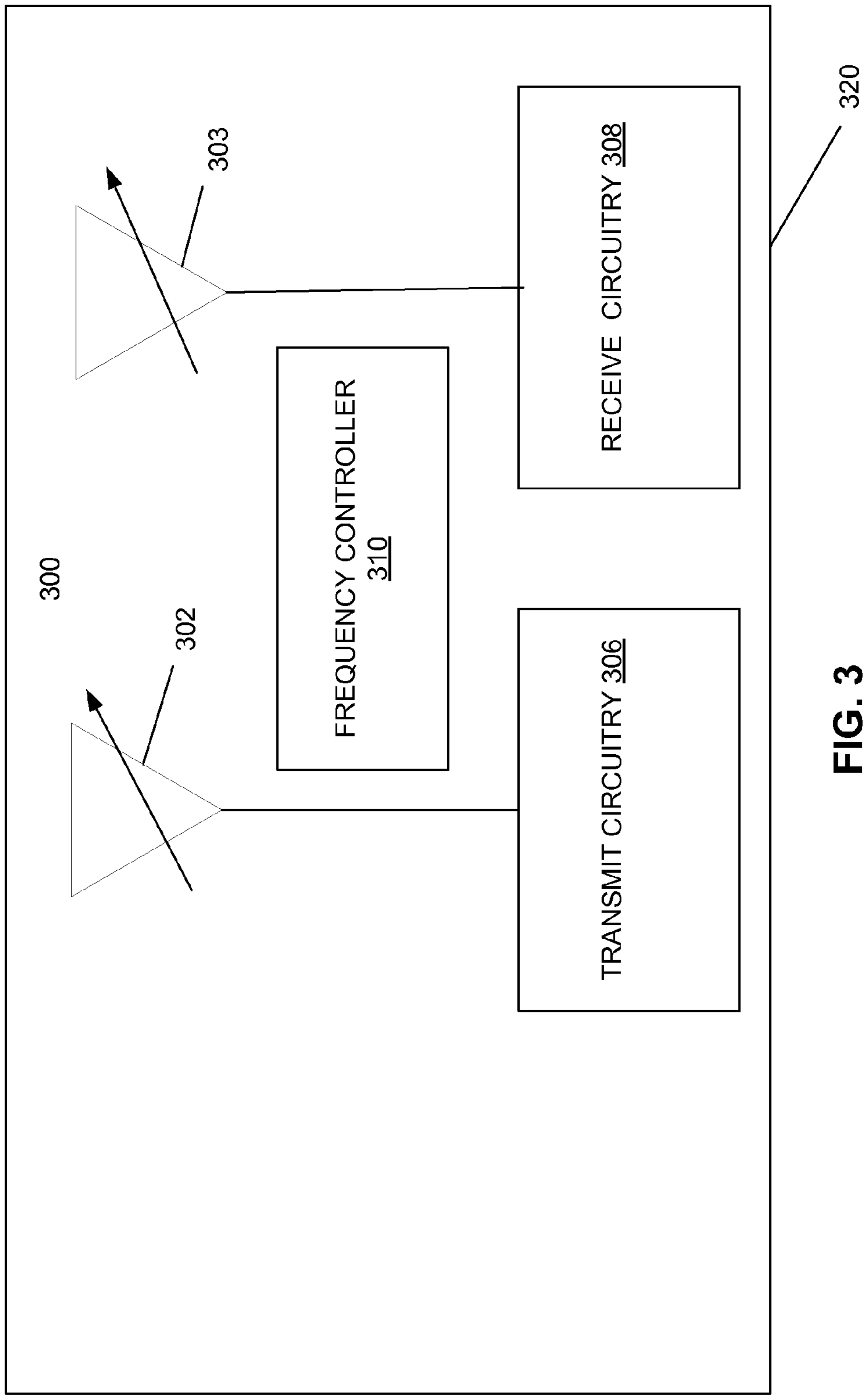
FIG. 3 illustrates a device with two tunable antennas in accordance with an aspect of the invention.

FIG. 3 illustrates a device 320 with two tunable antennas 302, 303, a frequency controller 310, transmit circuitry 306 and receive circuitry 308, in accordance with an aspect of the invention. The device 320 has one set of separate transmit and receive antennas 302, 303 that are tunable for multiple frequency bands and/or multiple wireless communication modes. The device 320 may be a wireless communication device, such as a mobile phone, a personal digital assistant (PDA), a pager, a stationary device, or a portable communication card (e.g., Personal Computer Memory Card International Association (PCMCIA)), which may be inserted, plugged in or attached to a computer, such as a laptop or notebook computer.

The antennas 302, 303 may be sufficiently small and sized to fit inside a particular communication device. The transmit and receive circuitries 306, 308 are shown as separate units, but may share one or more elements, such as a processor, memory, a pseudo-random noise (PN) sequence generators, etc. The device 320 may not require a duplexer 104, which may reduce the size and cost of the device 320.

The separate transmit and receive tunable antennas 302, 303 have frequency tuning/adapting elements, which may be controlled by frequency controller 310 to enable communication in multiple frequency bands (multi-band) (also called frequency ranges or set of channels) and/or according to multiple wireless standards (multiple modes) as further described below. The dual antenna system 300 may be configured to adaptively optimize its performance for a specific operating frequency. This may be useful for a user who wishes to use the device 320 in various countries or areas with different frequency bands and/or different wireless standards.

For example, the antennas 302, 303 may be tuned to operate in any frequency band of multi-band wireless applications, such as Code Division Multiple Access (CDMA), Extended Global System for Mobile communications (EGSM), Global Positioning System (GPS), Digital Cellular System (DCS), Universal Mobile Telecommunications System (UMTS), etc. The antennas 302, 303 may be used for CDMA 1x EVDO communication, which may use one or more 1.25-MHz carriers. The dual antenna system 300 may use multiple wireless standards (multiple modes), such as CDMA, GSM, Wideband CDMA (WCDMA), Time-Division Synchronous CDMA (TD-SCDMA), Orthogonal Frequency Division Multiplexing (OFDM), WiMAX, etc.

The tuning elements of transmit and receive antennas 302, 303 may be separate elements or integrated as a single element. The tuning elements may be attached to an SPnT switch as further described below (for n fixed capacitors) or an SPIT switch (for on/off) for each of the n fixed capacitors. The tuning elements may be controlled by separate control units in the transmit and receive circuitries 306, 308 or may be controlled by a single control unit, such as frequency controller 310.

It should be noted that the antennas 302, 303 may have narrower individual frequency responses to minimize coupling (or cross-talk) between the transmit and receive circuitries 306, 308. At any time slot, each antenna may cover only a small portion of a transmit or receive frequency sub-band around an operating channel.

The tuning elements may be used to change the operating frequency of the transmit and receive antennas 302, 303. The tuning elements may be voltage-variable micro-electro mechanical systems (MEMS), voltage-variable Ferro-Electric capacitors, varactors, varactor diodes or other frequency adjusting elements. As described above, the tuning elements may be attached to an SPnT switch (for n fixed capacitors) or an SPIT switch (for on/off) for each of the n fixed capacitors. For example, a different voltage or current applied to a tuning element may change a capacitance of the tuning element, which changes a transmit or receive frequency of the antenna 302 or 303.

The dual antenna system 300 may have one or more benefits. The dual antenna system 300 may be highly-isolated (low coupling, low leakage). A pair of orthogonal antennas may provide even higher isolation (lower coupling). High-Q and narrow-band antennas may provide high isolation between the transmit and receive chains in a full-duplex system, such as a CDMA system.

By using separate and small transmit and receive antennas 302, 303 with narrow instantaneous bandwidth to provide high isolation between the antennas 302, 303, the dual antenna system 300 may allow certain duplexers, multiplexers, switches and isolators to be omitted from radio frequency (RF) circuits in multi-band and/or multi-mode devices, which save costs and reduce circuit board area.

Smaller antennas provide more flexibility in selecting antenna mounting locations in the device 320.

The dual antenna system 300 may enhance harmonic rejection to provide better signal quality, i.e., better voice quality or higher data rate.

The dual antenna system 300 may enable integration of antennas with transmitter and/or receiver circuits to reduce wireless device size and cost. The frequency-tunable transmit and receive antennas 302, 303 may enable size and cost reduction of host multi-mode and/or multi-band wireless devices by reducing the size and/or number of antennas. It is appreciated that the antennas 302, 303 of FIG. 3 may be configured in a variety of ways and locations inside the device 320.

Figure 4:
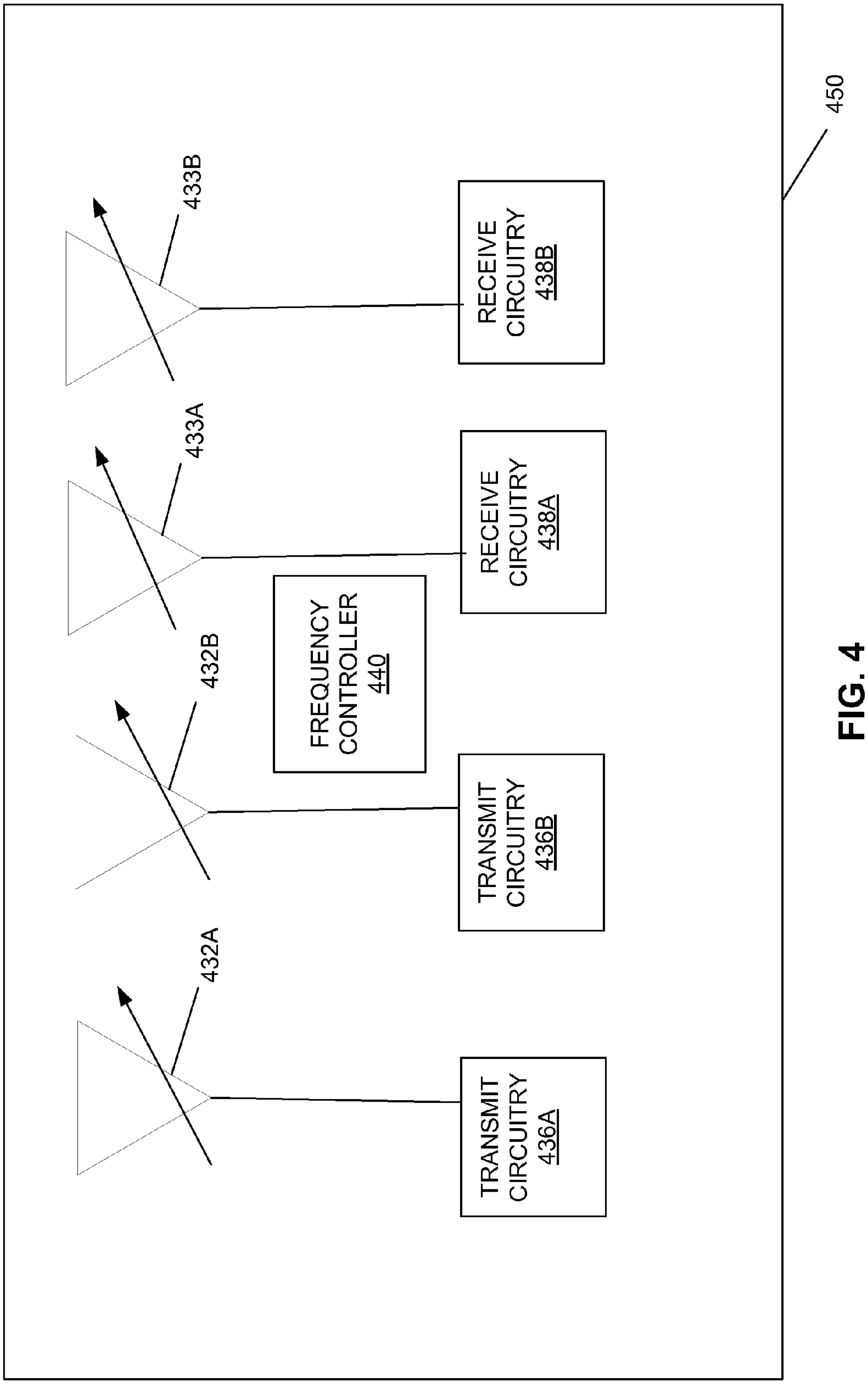
FIG. 4 illustrates a device with multiple tunable antenna, which may provide transmit and/or receive diversity.

The dual antenna system 300 may be used to implement a diversity feature, e.g., polarization diversity or spatial diversity as illustrated in FIG. 4, for example, in EVDO or MIMO systems. FIG. 4 illustrates a device with multiple tunable antennas 432A, 432B, 433A, 433B, which may provide transmit diversity and/or receive diversity. Any number of tunable transmit and/or receive antennas may be implemented.

Figure 5:
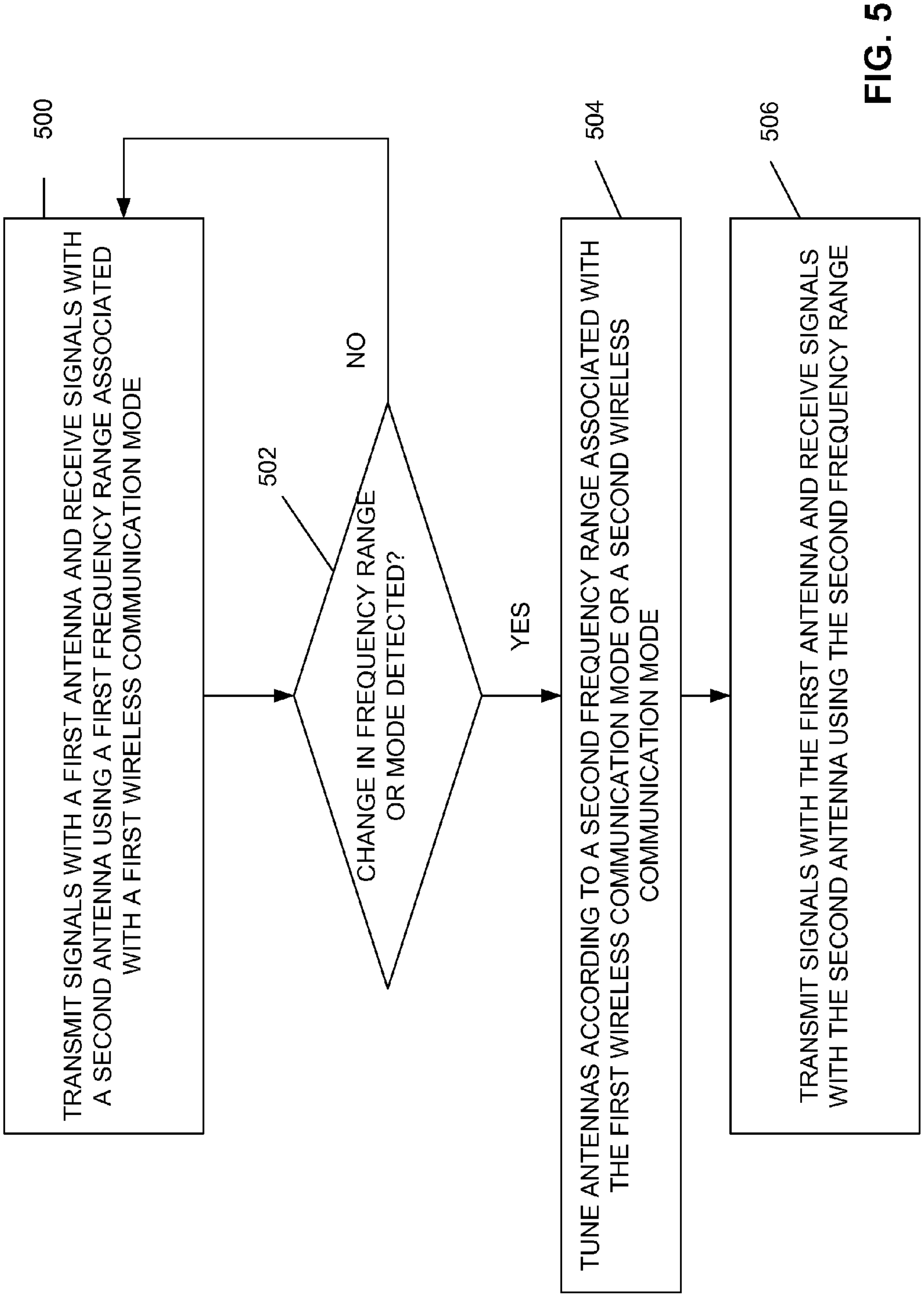
FIG. 5 illustrates a method of using the antenna system 300 of FIG. 3.

FIG. 5 illustrates a method of using the dual antenna system 300 of FIG. 3. In block 500, the dual antenna system 300 transmits signals with a first antenna 302 and receives signals with a second antenna 303 using a first frequency range associated with a first wireless communication mode. The first frequency range may be a set of channels, e.g., channels defined by different codes and/or frequencies.

In block 502, the device 320 determines whether there has been a change in frequency range and/or mode. If not, the dual antenna system 300 may continue in block 500. If there was a change, then the system 300 transitions to block 504. The device 320 may determine whether a frequency range and/or second wireless communication mode provides better communication (pilot or data signal reception, signal-to-noise ratio (SNR), frame error rate (FER), bit error rate (BER), etc.) than the first frequency range and/or wireless communication mode.

In block 504, the dual antenna system 300 tunes the antennas 302, 303 with the antenna elements according to a second frequency range associated with the first wireless communication mode or a second wireless communication mode. The second frequency range may be a set of channels, e.g., defined by different codes and/or frequencies.

In block 506, the dual antenna system 300 transmits signals with the first antenna 302 and receives signals with the second antenna 303 using the second frequency range.

It is appreciated that antenna designs may be required for a wide array of portable wireless device types including:

- Handsets in candy bar, clam shell, slider, and PDA packaging formats (with the antenna being internal or external to the handset);
- Plug and play modems for laptops such as PCMCIA and ExpressCard formats (with the antennas being integral to the card PCB);
- Full-sized and mini-sized laptops (with the antennas being embedded in the laptop display or keyboard area); and
- Desktop modems (with the antennas being mounted on the modems).

Selection of an antenna approach for a given device type will be heavily dependent on the allowable volume, shape and local structure in the vicinity of the antenna site.

Possible Operational Modes and Antenna Frequency Coverage

Given the above, the potential functional modes and frequency bands over which a portable device may operate vary significantly. That is, there are many possible combinations of modes and frequency bands. As can be seen, it may not be possible that all of the modes and bands identified in the following description may be implemented in a given portable device. As such, the required antenna frequency band coverage may depend on a subset of modes desired by a particular service provider and what spectrum is available for deployment.

Another complication will be if a particular service provider offers roaming services across continents. This will have the effect of greatly increasing the antenna frequency coverage requirements for the "world phones". As an example, consider a phone capable of operating in North America and Europe. Table 1 identifies potential frequency ranges required for a phone having dual antennas for MIMO and RX-TX diversity processing for different functionalities/modes.

TABLE 1

Operating Frequencies for Adaptable Antenna System

| Functionality/Mode | Frequency Band BC0 | BC1 | BC3 | BC4 | BC5 | BC6 | BC8 | BC9 |
|---|---|---|---|---|---|---|---|---|
| CDMA2000/EV-DO (Rev. 0, A, B, C) | X | X | X | X | X | | | |
| GSM/EDGE/GPRS | X | X | | | | | X | X |
| UMTS/HSDPA/HSUPA/HSPA+ | X | X | | | | X | | |
| 802.11a | | | | | | | | |
| 802.11b/g | | | | | | | | |
| 802.11n | | | | | | | | |
| 802.20 | | | | | | | | |
| Bluetooth | | | | | | | | |
| GPS | | | | | | | | |
| FLO | | | | | | | | |
| DVB-H | | | | | | | | |
| UWB | | | | | | | | |
| WiMax | | | | | | | | |

| Functionality/Mode | Frequency Band 2.4 GHz Band | 5 GHz Band | 2110-2170 MHz | 716-722 MHz | GPS | 470-862 MHz | 3-10 GHz | 2-11 GHz |
|---|---|---|---|---|---|---|---|---|
| CDMA2000/EV-DO (Rev. 0, A, B, C) | | | | | | | | |
| GSM/EDGE/GPRS | | | | | | | | |
| UMTS/HSDPA/HSUPA/HSPA+ | | | | | | | | |
| 802.11a | | X | | | | | | |
| 802.11b/g | X | | | | | | | |
| 802.11n | X | X | | | | | | |
| 802.20 | | | X | | | | | |
| Bluetooth | X | X | | | | | | |
| GPS | | | | | X | | | |
| FLO | | | | X | | | | |

TABLE 1-continued

| Operating Frequencies for Adaptable Antenna System | | | |
|---|---|---|---|
| DVB-H | X | | |
| UWB* | | X | |
| WiMax** | | | X |

| Frequency Band-Class Definitions | (MHz) |
|---|---|
| BC0 | 824-894 |
| BC1 | 1850-1990 |
| BC3 | 832-925 |
| BC4 | 1750-1870 |
| BC5 (blocks A, B, C, F, G, H) | 450-493.80 |
| BC5 (blocks D, E) | 411.675-429.975 |
| BC6 IMT | 1920-2170 |
| BC8 | 1710-1880 |
| BC9 | 880-960 |
| 2.4 GHz Band | 2400-2484 |
| 5 GHz Band | 5150-5875 |
| GPS | 1575 +/− 1 MHz |

*UWB will require antennas with at least 1 octave frequency band coverage within 3-10 GHz
**WiMax will deploy in smaller sub-bands within 2-11 GHz range As can be seen from Table 1, achieving all of the bandwidths of the different modes in a single passive antenna element given the space available in typical portable devices is an extreme challenge. A dual resonant antenna structure may be considered to improve the situation but even this approach would require sub-bands with dual band coverage for lower and upper bands, respectively. Even if more bands are added to support, for instance, broadcast services like FLO (approximately 716-722 MHz) and DVB-H (approximately 470-862 MHz), the problem is further exacerbated.

Hence, it is likely that the required frequency coverage will exceed practical limits if a passive single antenna approach is implemented in small portable radios. Accordingly, either multiple antennas and/or actively-tuned antenna technologies have to be considered to address this problem.

Number of Antenna Elements

In addition to the many modes of operation, future radios implementing DO Revs. B and C will implement advanced signal processing techniques such as mobile receive diversity (MRD), mobile transmit diversity (MTD) and MIMO (multiple input, multiple output). These require more than one antenna element operating at the same frequency to be implemented on the device. With MIMO, up to 4 antenna elements may be required. In addition, antennas used for GPS, Bluetooth and 802.11a/b/g (WLAN) must also be considered. Table 2 below shows the number of antennas required assuming each individual mode has it own set of antennas.

TABLE 2

Number of Antenna Required for Operating Modes in Table 1

| Standard | # Antennas Needed for Individual Modes |
|---|---|
| 1x EVDO, Rev. A | 1 TX-[4]-RX[5], 1 RX |
| 1x EVDO, Rev. B | 2 TX-RX for handsets, 4 TX-RX for laptops, desktop modems, PC cards |
| 1x EVDO, Rev. C | 2 TX-RX for handsets, 4 TX-RX for laptops, desktop modem, PC cards |
| UMTS-LTE (Europe) | 2 TX-RX for handsets, 4 TX-RX for laptops, desktop modems, PC cards |
| GSM (Europe) | 1 TX-RX |
| GPS | 1 RX |

TABLE 2-continued

Number of Antenna Required for Operating Modes in Table 1

| Standard | # Antennas Needed for Individual Modes |
|---|---|
| BlueTooth/UWB | 1 TX-RX |
| 802.11a/b/g | 2 TX-RX |
| 802.11n | 2 TX-RX for handset, 3-4 TX-RX for laptops, desktop modems, PC cards |
| DVB-H/FLO | 1 RX |

[1] MRD = Mobile RX diversity
[2] MIMO = Multiple input, Multiple output processing
[3] MTD = Mobile TX diversity
[4] TX = transmit
[5] RX = receive As can be seen from Table 2, a radio implementing all modes with individual antennas for each mode would not be practical and some sharing of individual modes on single antenna element(s) will be required. The use of broadband or multi-band techniques and/or tunable antenna technologies may be considered to reduce the number of required antennas in a given platform. The feasibility of these approaches and the number of antennas required are driven by the number of bands and modes being shared on a given antenna element. Furthermore, the number of antenna elements required is determined by the instantaneous bandwidth required for each sub-band, the requirements for simultaneity between the various modes servicing the different antenna elements, and the mechanical constraints imposed by the radio's industrial design. These factors together determine the allowable size, location, and required isolation between the various antenna elements on a given platform.

Antenna Configurations for Sharing Modes

The selection of the number and type of antennas is driven by the modes selected and bands of interest to be implemented. As mentioned earlier, passive and active (tunable) approaches may be considered as a means to reduce the number of antenna elements. Passive antenna structures have fixed electrical characteristics after they are integrated in a given platform. As mentioned earlier, it is not practical to design small antennas for portable devices capable of working over the multi-octave bandwidths as implied by the modes of Table 1. It is more likely more than one antenna with different sub-bands will be required to support the many modes.

It should be noted that considerable antenna development may be required to extend the lower portion of the upper band to cover GPS in a small form factor. Furthermore, it may also be difficult to implement four antennas in a small handset or PCMCIA card without incurring poor antenna to antenna isolation. Poor isolation may cause unwanted interaction (e.g., receiver de-sense) between modes operating simultaneously on the device. In addition, this coupling may cause degradation to antenna gain efficiency due to power coupled to nearby antennas that is dissipated rather than radiated. Thus, the passive approach is not ideal for the design of antennas for portable devices to be working over the multi-octave bandwidths of the modes illustrated in Table 1.

Active Antenna Configurations for Mode Sharing

Figure 6:
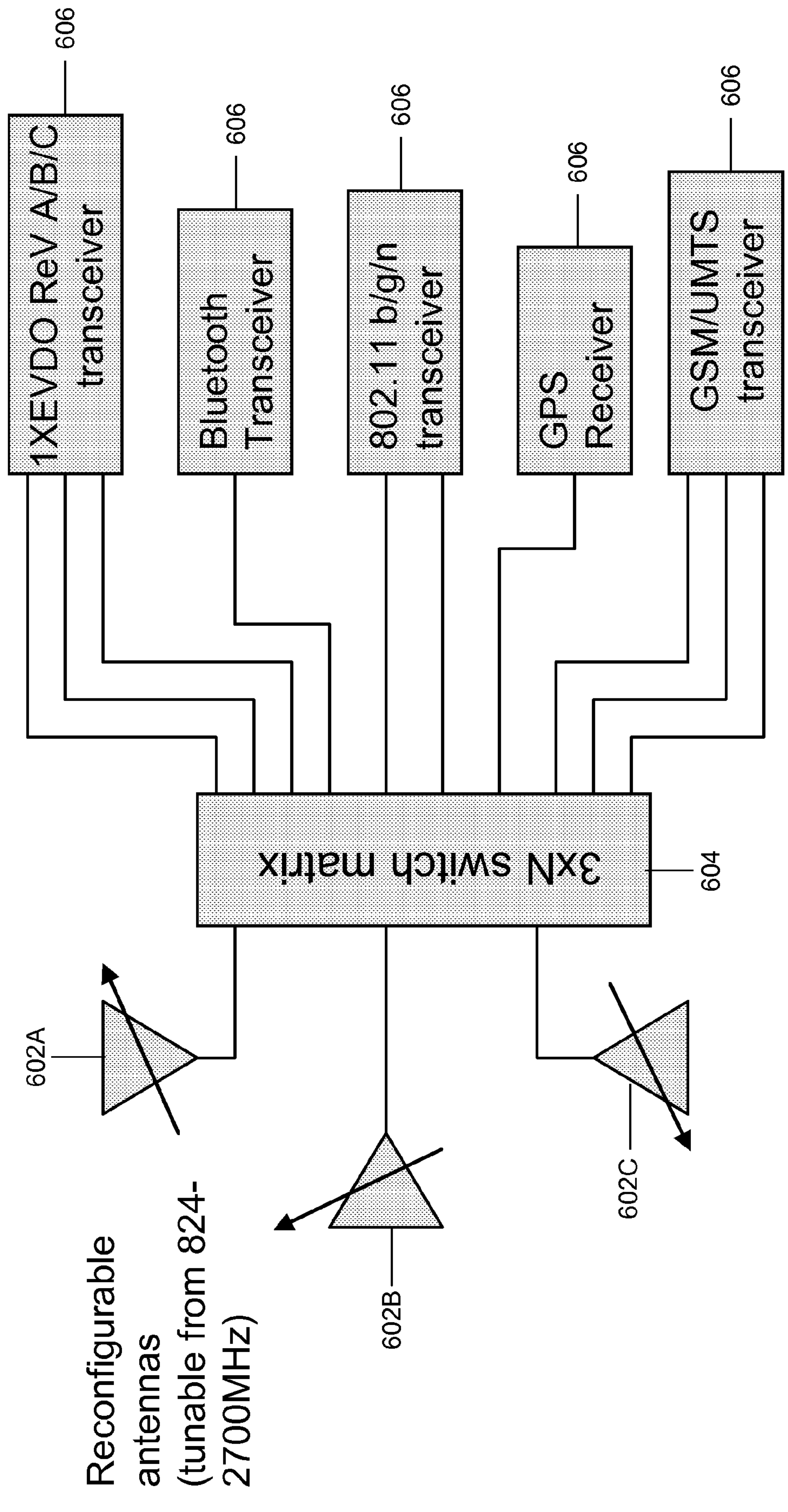
FIG. 6 illustrates a set of tunable or reconfigurable antennas of the invention.

An aspect of the invention is that tunable or reconfigurable antenna technologies may address several of the problems that fixed or passive approaches cannot. Referring to FIG. 6, there is shown one configuration or scheme of the invention including three antennas 602A-602C designed to tune a narrow(er) band resonance over frequencies from approximately 800-2700 MHz. A M×N switch matrix 604 is used to connect M antennas 602 to N different RF circuits or radios 606. Any of the N circuits or radios 606 may connect to any of the M antennas 602 via this M×N switch matrix 604. If M is smaller than N, then M different antennas 602 may connect to a subset of M RF circuits or radios simultaneously. If M is greater than N, then a subset of N antennas may connect to the N different RF circuits or radios simultaneously. This switch matrix may be built from M SPNT switches and N SPMT switches. It may also be built as an integrated device with internal switches. In this configuration or scheme, the antennas 602A-602C cover most of the band classes indicated in Table 1.

Figure 7B:
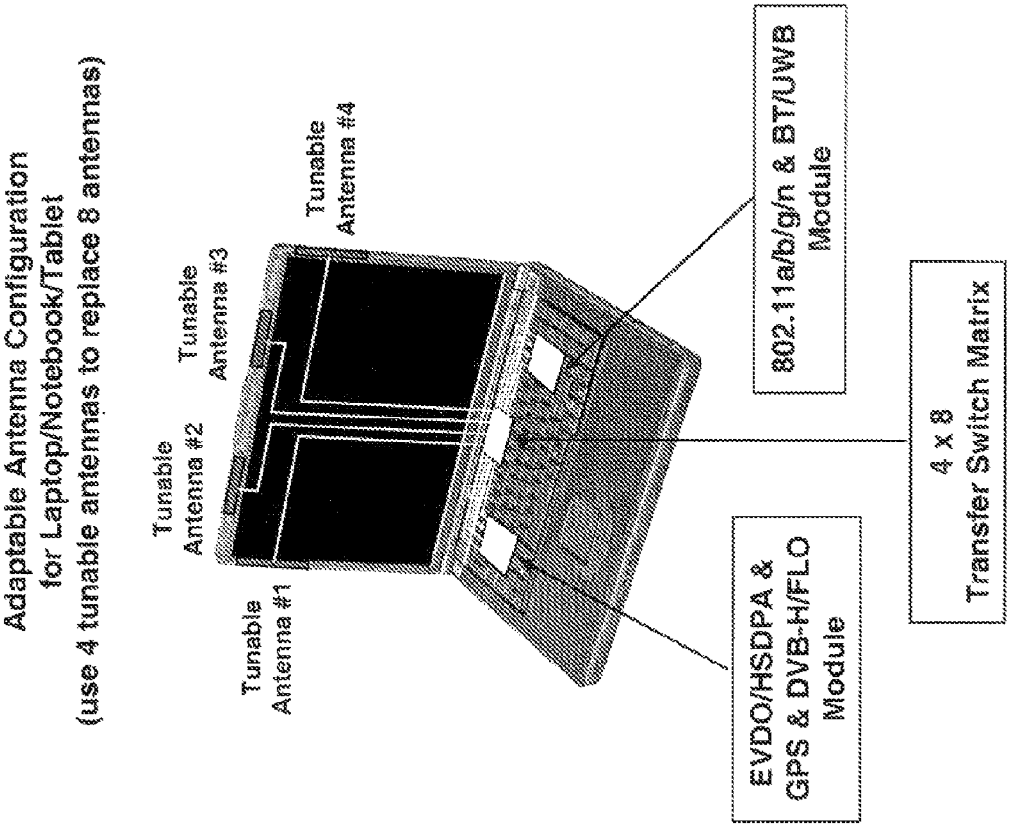
FIGS. 7(*a*) and 7(*b*) illustrate a fixed antenna configuration for laptop/notebook/tablet using 8 antennas and an adaptable antenna configuration for a laptop/notebook/tablet using 4 tunable antennas to replace the 8 fixed antennas.
Figure 7A:
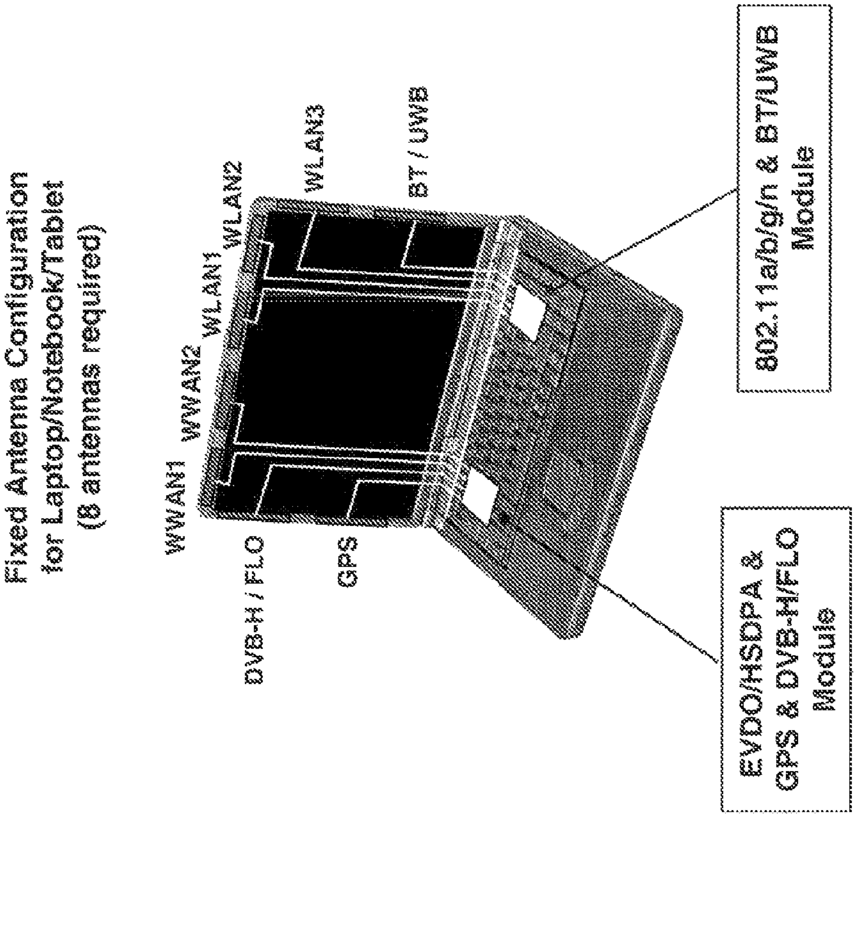

In one example, FIG. 7(*a*) illustrates a fixed antenna configuration for a laptop/notebook/tablet using 8 antennas and FIG. 7(*b*) illustrates an adaptable antenna configuration for a laptop/notebook/tablet using 4 tunable antennas and a 4×8 transfer switch matrix to replace the 8 fixed antennas of FIG. 7(*a*).

There are several potential benefits to the approach of the invention including:

- Fewer antennas required to service all possible modes and band classes;
- Tunable antennas may be smaller than fixed antennas allowing for more options for fitting in;
- No compromise in "band edge" antenna performance compared to fixed bandwidth antenna approaches (antenna is "tuned" optimally);
- Tuning narrow band resonances improves out of band isolation;
- Modes may be allocated to antennas in a way that is best for simultaneous operation (least coupling);
- Modes may be allocated dynamically in response to changing RF environment and body loading; and
- Allows for higher order MIMO/diversity processing (N=3 for handsets and N=4 for laptops).

It should be noted, however, that the tradeoff may include:

- Increased cost complexity of the RF front end and control electronics required to route the outputs from the various antennas to the various transceivers;
- Availability of commercial high power tuning devices (e.g., tunable capacitors) used to tune the antenna structures; and
- Potential for added factory calibration of tunable antenna elements.

For this approach, the tradeoff between the desired flexibility for mode allocation versus the cost/complexity of the front end and control electronics is important in establishing commercial feasibility. Regarding antenna design, it is appreciated that one needs to understand the minimum antenna size for a given device type that allows for tunability over the desired frequency range while at the same time providing good antenna efficiency, the impact of coupling on the tunability, and the requirements for factory calibration and impact of device tolerances.

Hybrid Configurations for Mode Sharing

Hybrid configurations refer to a combination of fixed and tunable antenna technologies. For example, the invention stated earlier that dual band antenna solutions covering BC0/BC9 and BC8/BC1 exist commercially today. For this case, it may be easier to tune the upper band lower in frequency to cover GPS or higher in frequency to cover IMT and MMDS bands (assuming lower 800-900 MHz band requires no tuning) than it would be to come up with a structure that tunes all the way from 824 to 2700 MHz. There may be many combinations that are possible and the feasibility of each will depend on the modes and band classes selected, the simultaneity requirements, and the device type (e.g., small handset vs. desktop modem or laptop).

Impact of Simultaneity Requirements

Simultaneity refers to the modes operating simultaneously on a given radio. For instance, one could require position location activities using GPS while operating simultaneously with a 1x EVDO Rev. C data session or a 1x voice call. Requirements for simultaneity impact the desired antenna to antenna isolation and hence the options for the antenna element relative locations, the types of elements, their orientation as well the level of front end filtering which impacts the achievable front end loss.

A careful analysis will be needed to define the total isolation required allowing for simultaneous operation and the tradeoff between filter rejection (and added filter loss) and allowable antenna to antenna coupling.

Given the above, physically small and narrow-band antennas with electrically tunable resonant frequency may be employed in a wireless device. These antennas may be purposely designed to have very narrow frequency response only enough to cover the required instantaneous frequency bandwidth of one or few wireless channels or a portion of a frequency band depending on the wireless standards being used on this wireless device. This wireless device may be a portable phone, PDA, laptop, body-worn sensor, entertainment component, wireless router, tracking device and others. By making the antenna narrow-band in its frequency response, its physical size may be made much smaller than a conventional resonant antenna currently being used in existing wireless devices. To operate at a desired wireless channel or in a certain frequency sub-band or band at any given time, this small antenna is designed to have electronically selectable resonant frequency feature. This frequency adaptability allows for one small antenna to cover all the required wireless standards and frequency bands. Under many circumstances, more than one wireless modes may be required to operate concurrently; for example, CDMA and 802.11 may be on at the same time. In this case, a second small tunable antenna similar to the first one may be employed on the same host wireless device. These two antennas may operate in different bands simultaneously; for example, WWAN on together with WLAN on a laptop. These antennas may also operate in the same frequency band simultaneously as in the case of 802.11n (for MIMO) or EVDO (for RX diversity). Furthermore, in the same frequency band, one of these antennas may be used for transmitting and the other may be used for receiving simultaneously. Since these antennas have very narrow operating frequency response or pass band, the isolation between these antennas is much higher than that between the existing antennas currently being used on existing wireless devices. This is another feature of the invention, i.e., high isolation between antennas for concurrent operation without the need of adding more front-end filters.

The number of these small, narrow-band, frequency tunable antennas may also be increased to more than two to support more than two concurrent operating modes. The operating frequencies and modes of these antennas may be adaptable to where resource and performance are needed most in the host device based on a preset performance criteria or user preference and selectivity. This allows for fewer number of antennas that can cover a given number of wireless modes and frequency bands. Performance is optimized and adaptable to where it is needed and/or required. For example, if EVDO and 802.11n are both on, then two antennas may be dedicated to EVDO and two for 802.11n. When EVDO is no longer needed, its two antennas may be used for 802.11n to increase performance of 802.11n. Antenna resource in this invention is adaptable and may be redirected to where it is needed most or may be divided based on a certain order of priorities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A wireless communication device comprising:

a first antenna having a first tunable element for changing a first transmit or receive frequency band associated with a first communication mode to a different transmit or receive frequency band or for changing the first communication mode to a second communication mode; and a second antenna having a second tunable element for changing a second transmit or receive frequency band associated with the first communication mode to a different transmit or receive frequency band or for changing the first communication mode to the second communication mode, the first and second antennas configured to simultaneously operate in different communication modes, wherein each of the first antenna and the second antenna is selectively operable with one of a plurality of circuits, each circuit associated with a different communication mode and wherein the tunable elements switch one or more fixed capacitors to tune the antennas, and the first and second antennas are orthogonally positioned to one another.

2. The device of claim 1, further comprising a third antenna having a third tunable element for providing transmit or receive diversity.

3. The device of claim 2, wherein the first, second and third antennas are narrow pass-band and frequency adaptable antennas.

4. The device of claim 3, wherein the first, second and third antennas' narrow pass frequency bands are isolated from each other.

5. The device of claim 2, wherein the first, second and third antennas are broadband antennas.

6. The device of claim 2, wherein the frequency bands comprise at least two of:

WWAN (Wireless Wide Area Network) for serving 1x EVDO Revs. A/B/C, 1x-RTT, Extended Global System for Mobile communications (EGSM), Universal Mobile Telecommunications System (UMTS) and Global Positioning System (GPS), WLAN for serving Bluetooth-IEEE 802.11a/b/g and MMDS (Multichannel Multipoint Distribution Service) band IEEE 802.11n, DVB-H (Digital Video Broadcast-Handheld), FLO (Forward Link Only), and UWB (Ultra Wide Band).

7. The device of claim 1, wherein the device includes a portable phone, a PDA, a laptop, a body-worn sensor, an entertainment component, a wireless router or a tracking device.

8. The device of claim 1, wherein the first and second communication modes comprise at least two of CDMA (Code Division Multiple Access), GSM, Wideband CDMA (WCDMA), Time-Division Synchronous CDMA (TD-SCDMA), Orthogonal Frequency Division Multiplexing (OFDM) and WiMAX.

9. The device of claim 1, wherein the first and second antennas are configured to operate in the same frequency bands simultaneously.

10. The device of claim 1, wherein the first and second antennas are configured to operate in different frequency bands simultaneously.

11. The device of claim 2, wherein the first, second and third antennas are orthogonally positioned to one another.

12. The device of claim 2, wherein the communication modes are allocated to the antennas to provide for at least one of simultaneous operation, least coupling and in response to changing RF environment and body loading.

13. The device of claim 2, wherein the antennas allow for a higher order of multiple input, multiple output (MIMO) and diversity processing.

14. The device of claim 2, wherein at least one of the first, second and third antennas is used to suppress interference within the device.

15. The device of claim 2, wherein the first, second and third tunable elements comprise voltage-variable micro-electro mechanical systems (MEMS), voltage-variable Ferro-Electric capacitors, varactor, varactor diodes or other frequency adjusting elements.

16. The device of claim 1, wherein the operating frequencies and communication modes of the antennas are adaptable to where resource and performance are needed most in the device based on a preset criteria or user preference and selectivity.

17. A wireless communication device comprising:

a first transceiving means having a first tuning means for changing a first transmit or receive frequency band associated with a first communication mode to a different transmit or receive frequency band or for changing the first communication mode to a second communication mode; and a second transceiving means having a second tuning means for changing a second transmit or receive frequency band associated with the first communication mode to a different transmit or receive frequency band or for changing the first communication mode to the second communication mode, the first transceiving means and the second transceiving means configured to simultaneously operate in different communication modes, wherein each of the first transceiving means and the second transceiving means is selectively operable with one of a plurality of circuits, each circuit associated with a different communication mode and wherein the tuning means switch one or more fixed capacitors to tune the transceiving means, and antennas of the first and second transceiving means are orthogonally positioned to one another.

18. A wireless communication device comprising:

a first antenna having a first tunable element for changing a first transmit or receive frequency set of channels associated with a first communication mode to a different transmit or receive frequency set of channels or for changing the first communication mode to a second communication mode; and a second antenna having a second tunable element for changing a second transmit or receive frequency set of channels associated with the first communication mode to a different transmit or receive frequency set of channels or for changing the first communication mode to the second communication mode, the first and second antennas configured to simultaneously operate in different communication modes, wherein each of the first antenna and the second antenna is selectively operable with one of a plurality of circuits, each circuit associated with a different communication mode and wherein the tunable elements switch one or more fixed capacitors to tune the antennas, and the first and second antennas are orthogonally positioned to one another.

19. A method in a wireless communications device, comprising:

transmitting or receiving signals with a first antenna using a first frequency range and transmitting or receiving signals with a second antenna using a second frequency range associated with a first communication mode;

tuning the first antenna having a first tunable element for changing the first transmit or receive frequency range associated with the first communication mode to a different transmit or receive frequency range or for changing the first communication mode to a second communication mode;

tuning the second antenna having a second tunable element for changing the second transmit or receive frequency range associated with the first communication mode to a different transmit or receive frequency range or for changing the first communication mode to the second communication mode; and transmitting or receiving signals with at least one of the first and second antennas using at least one of the different transmit or receive frequency ranges and with the second communication mode, the first and second antennas configured to simultaneously operate in different communication modes, wherein each of the first antenna and the second antenna is selectively operable with one of a plurality of circuits, each circuit associated with a different communication mode and wherein the tunable elements switch one or more fixed capacitors to tune the antennas, and the first and second antennas are orthogonally positioned to one another.

20. The method of claim 19, further comprising determining whether the second communication mode provides better communication than the first communication mode.

21. The method of claim 19, further comprising:

transmitting or receiving signals with a third antenna using a third frequency range; and tuning the third antenna having third first tunable element for providing transmit or receive diversity.

22. The method of claim 21, wherein the first, second and third antennas are narrow pass-band and frequency adaptable antennas.

23. The method of claim 22, wherein the first, second and third antennas' narrow pass frequency bands are isolated from each other.

24. The method of claim 21, wherein the first, second and third antennas are orthogonally positioned to one another.

25. The method of claim 21, wherein the frequency ranges comprise at least two of:

WWAN (Wireless Wide Area Network) for serving 1x EVDO Revs. A/B/C, 1x-RTT, Extended Global System for Mobile communications (EGSM), Universal Mobile Telecommunications System (UMTS) and Global Positioning System (GPS), WLAN for serving Bluetooth-IEEE 802.11a/b/g and MMDS (Multichannel Multipoint Distribution Service) band IEEE 802.11n, DVB-H (Digital Video Broadcast-Handheld), FLO (Forward Link Only), and UWB (Ultra Wide Band).

26. The method of claim 19, wherein the first and second communication modes comprise at least two of CDMA (Code Division Multiple Access), GSM, Wideband CDMA (WCDMA), Time-Division Synchronous CDMA (TD-SCDMA), Orthogonal Frequency Division Multiplexing (OFDM) and WiMAX.

27. The method of claim 19, wherein the first and second antennas are configured to operate in the same frequency ranges simultaneously.

28. The method of claim 19, wherein the first and second antennas are configured to operate in different frequency ranges simultaneously.

29. The method of claim 21, wherein the communication modes are allocated to the antennas to provide for at least one of simultaneous operation, least coupling and in response to changing RF environment and body loading.

30. The method of claim 21, wherein the antennas allow for a higher order of multiple input, multiple output (MIMO) and diversity processing.

31. The method of claim 21, wherein at least one of the first, second and third antennas is used to suppress interference within the device.

32. A method in a wireless communications device, comprising:

transmitting or receiving signals with a first antenna using a first frequency range and transmitting or receiving signals with a second antenna using a second frequency range associated with a first communication mode;

changing the first transmit or receive frequency range associated with the first communication mode to a different transmit or receive frequency range or changing the first communication mode to a second communication mode;

changing the second transmit or receive frequency range associated with the first communication mode to a different transmit or receive frequency range or changing the first communication mode to the second communication mode; and transmitting or receiving signals with at least one of the first and second antennas using at least one of the different transmit or receive frequency ranges and with the second communication mode, the first and second antennas respectively having first and second tunable elements and configured to simultaneously operate in different communication modes, wherein each of the first antenna and the second antenna is selectively operable with one of a plurality of circuits, each circuit associated with a different communication mode and wherein the tunable elements switch one or more fixed capacitors to tune the antennas, and the first and second antennas are orthogonally positioned to one another.

33. The method of claim 32, wherein the first and second antennas are broadband antennas.

34. The method of claim 32, further comprising:

transmitting or receiving signals with a third antenna using a third frequency range, wherein the third antenna provides transmit or receive diversity.

35. The device of claim 2, wherein the first, second and third tunable elements are attached to an SPnT (Single Pole n Throw) switch for the one or more fixed capacitors.

36. The device of claim 2, wherein the first, second and third tunable elements are attached to an SPIT (Singe Pole one Throw) on/off switch for each of the one or more fixed capacitors.

37. The device of claim 2, wherein at least one of the first, second and third antennas is used to mitigate body or external effects.

* * * * *